US012651736B2

(12) United States Patent
Birner et al.

(10) Patent No.: US 12,651,736 B2
(45) Date of Patent: Jun. 9, 2026

(54) PRESSURE-STABILIZED DUAL INLET GAS MASS SPECTROMETRY

(71) Applicant: The Regents of the University of California, Oakland, CA (US)

(72) Inventors: Benjamin Birner, San Diego, CA (US); Ralph Keeling, San Diego, CA (US); Jeffrey Severinghaus, La Jolla, CA (US)

(73) Assignee: The Regents at the University of California, Oakland, CA (US)

( * ) Notice: Subject to any disclaimer, the term of this patent is extended or adjusted under 35 U.S.C. 154(b) by 316 days.

(21) Appl. No.: 18/556,516

(22) PCT Filed: May 4, 2022

(86) PCT No.: PCT/US2022/027698
§ 371 (c)(1),
(2) Date: Oct. 20, 2023

(87) PCT Pub. No.: WO2022/235819
PCT Pub. Date: Nov. 10, 2022

(65) Prior Publication Data
US 2024/0186131 A1 Jun. 6, 2024

Related U.S. Application Data

(60) Provisional application No. 63/184,745, filed on May 5, 2021.

(51) Int. Cl.
*H01J 49/04* (2006.01)
*G01D 5/16* (2006.01)

(52) U.S. Cl.
CPC ...... *H01J 49/0495* (2013.01); *H01J 49/0422* (2013.01); *G01D 5/16* (2013.01)

(58) Field of Classification Search
CPC ..... H01J 49/0495; H01J 49/0422; G01D 5/16
See application file for complete search history.

(56) References Cited

U.S. PATENT DOCUMENTS

| | | | |
|---|---|---|---|
| 4,315,149 A | 2/1982 | Ledford, Jr. | |
| 4,641,541 A * | 2/1987 | Sharp ................. | G01N 30/7213 |
| | | | 73/864.81 |
| 4,662,914 A * | 5/1987 | Hansen ............... | H01J 49/0422 |
| | | | 96/106 |
| 7,312,444 B1 | 12/2007 | Willougbhy et al. | |
| 8,525,111 B1 | 9/2013 | Brown et al. | |

(Continued)

*Primary Examiner* — Nicole M Ippolito
(74) *Attorney, Agent, or Firm* — FisherBroyles, LLP

(57) ABSTRACT

A mass spectrometer system for a mass spectrometer is provided. The mass spectrometer system includes a bellows system including a bellows configured to contain a gas and have an internal pressure within the bellows, and a housing configured to surround the bellows. The mass spectrometer system also includes a control system coupled to the bellows system. The control system includes a controller configured to continuously maintain the internal pressure of the bellows at a constant pressure within the bellows and cause, based on the continuous maintaining, delivery of the gas at the constant pressure from the bellows to the mass spectrometer. Related methods and articles of manufacture are also disclosed.

20 Claims, 8 Drawing Sheets

(56)                    References Cited

U.S. PATENT DOCUMENTS

| | | | |
|---|---|---|---|
| 2004/0225457 A1* | 11/2004 | Norenberg ......... | G01N 15/0826 |
| | | | 702/45 |
| 2011/0174966 A1 | 7/2011 | Wollnik et al. | |
| 2012/0122705 A1* | 5/2012 | Ting ...................... | G01N 1/286 |
| | | | 436/174 |
| 2013/0256523 A1 | 10/2013 | Steiner et al. | |

* cited by examiner

PRESSURE-STABILIZED DUAL INLET GAS MASS SPECTROMETRY

CROSS-REFERENCE TO RELATED APPLICATIONS

This application is a national stage entry of Patent Cooperation Treaty Application No. PCT/US2022/027698 filed May 4, 2022, entitled "PRESSURE-STABILIZED DUAL INLET GAS MASS SPECTROMETRY," which claims priority to U.S. Provisional Application No. 63/184,745 filed May 5, 2021, entitled "PRESSURE-STABILIZED DUAL INLET GAS MASS SPECTROMETRY," the disclosures of which are incorporated herein by reference in their entirety.

STATEMENT OF GOVERNMENT SUPPORT

This invention was made with government support under AGS1940361 awarded by the National Science Foundation. The government has certain rights in the invention.

FIELD

The subject matter described herein relates generally to mass spectrometry, and more specifically to a pressure-stabilized dual inlet gas mass spectrometer system.

BACKGROUND

Mass spectrometry is an analytical technique that is used to measure the mass-to-charge ratio of ions, among other aspects of gases. Mass spectrometers for high precision gas isotope measurements (e.g., noble gases, carbon, nitrogen) may be equipped with a dual inlet system in which one side contains the unknown sample gas and the second side contains a known standard. Repeated comparisons of the two gases flowing from the inlet system into the mass spectrometer allow precise determination of differences in the gas composition. However, when certain properties, such as a pressure and/or a flow rate of the two gases differ, the measurements and comparisons may become biased and increasingly inaccurate.

SUMMARY

According to some aspects, a mass spectrometer system for a mass spectrometer includes a bellows system and a control system coupled to the bellows system. The bellows system includes a bellows configured to contain a gas. The bellows has an internal pressure within the bellows. The bellows system may also include a housing configured to surround the bellows. The control system includes a controller configured to continuously maintain the internal pressure of the bellows at a constant pressure and cause, based on the continuously maintaining, delivery of the gas at the constant pressure from the bellows to the mass spectrometer.

In some aspects, the control system includes: a valve coupled to the housing of the bellows system. The controller may continuously modulate the valve based on the internal pressure of the bellows to maintain the internal pressure of the bellows.

In some aspects, the continuous modulation of the valve by the controller is configured to adjust an external pressure within the housing and surrounding the bellows. The adjustment of the external pressure is configured to maintain the internal pressure of the bellows.

In some aspects, the control system further includes: a vacuum pump coupled to the valve. The continuous modulation of the valve by the controller includes causing the valve to open. The vacuum pump evacuates air from the housing when the valve is open. The evacuation of the air from the housing causes a decrease in the internal pressure of the bellows.

In some aspects, the control system further includes an air leak configured to constantly leak air into the housing. The continuous modulation of the valve includes causing the valve to close. The air leak causes an increase in the internal pressure of the bellows when the valve is closed.

In some aspects, the valve includes a solenoid valve.

In some aspects, the control system further includes: a data acquisition device coupled to the controller. The bellows system further includes a pressure gauge coupled to the bellows and configured to measure the internal pressure of the bellow. The data acquisition device is configured to receive the measured internal pressure from the pressure gauge for use by the controller to continuously maintain the internal pressure of the bellows.

In some aspects, the bellows system further includes a sliding potentiometer. The controller is configured to continuously modulate the valve based on the internal pressure of the bellows and/or a measured change in resistance of the sliding potentiometer to maintain the internal pressure and/or adjust the position of the bellows.

In some aspects, the housing is configured to maintain a vacuum around the bellows.

In some aspects, the bellows system further includes a spring coupled to the bellows system. The spring is configured to exert a force on the bellows.

In some aspects, the spring is a constant force spring.

In some aspects, the bellows system further includes a mounting plate on which the bellows and the housing are mounted. The spring is positioned on an opposite side of the mounting plate relative to the bellows and the housing.

In some aspects, the control system includes an actuator coupled to the bellows. The actuator is configured to continuously adjust a force exerted on the bellows. The continuous adjustment of the force exerted on the bellows is configured to maintain the constant pressure within the bellows.

In some aspects, the actuator is a motor. In some aspects, the motor is at least one of a stepper motor and a piezoelectric motor.

In some aspects, the gas is a sample gas or a reference gas.

In some aspects, the system includes a second bellows system including a second bellows and a second housing. The second bellows is configured to contain a second gas different from the first gas. The second bellows has a second internal pressure within the second bellows. The second housing is configured to surround the second bellows. The controller is configured to: continuously maintain the second internal pressure of the second bellows at a second constant pressure and cause the second gas from the second bellows to be delivered to the mass spectrometer at the second constant pressure. The second constant pressure is the same as the first constant pressure.

In some aspects, the continuous maintaining of the internal pressure at the constant pressure and the second internal pressure at the second constant pressure is configured to allow a constant flow of gas from the first bellows and the second bellows to the mass spectrometer. The constant flow of gas is configured to allow for a mole fraction difference of any observable isotope in a mix between the first gas and the second gas to be determined by at least monitoring changes in a beam intensity of the isotope while alternating between first gas and the second gas.

According to some aspects, a method includes continuously maintaining an internal pressure of a bellows at a constant pressure. The bellows is configured to contain a gas and be positioned with a housing. The method may also include causing, based on the continuously maintaining, delivery of the gas at the constant pressure from the bellows to the mass spectrometer.

In some aspects, the continuously maintaining includes continuously modulating, based on the internal pressure, a valve coupled to the housing of the bellows.

In some aspects, the continuously modulating is configured to adjust an external pressure within the housing and surrounding the bellows. The adjustment of the external pressure is configured to maintain the internal pressure of the bellows.

In some aspects, the continuously modulating includes opening, based on the internal pressure, the valve to evacuate air from the housing, thereby causing a decrease in the internal pressure of the bellows.

In some aspects, an air leak is configured to constantly leak air into the housing. The continuously modulating includes closing, based on the internal pressure, the valve to increase the internal pressure of the bellows. The increase in the internal pressure is further caused by the constant leakage of air into the housing.

In some aspects, the valve includes a solenoid valve.

In some aspects, the method includes continuously modulating the valve based on a change in resistance of a potentiometer coupled to the bellows to maintain the internal pressure of the bellows.

In some aspects, the housing is configured to maintain a vacuum around the bellows.

In some aspects, the method includes continuously adjusting a force exerted on the bellows by an actuator coupled to the bellows to maintain the internal pressure at the constant pressure.

In some aspects, the actuator is a motor.

In some aspects, the motor is at least one of a stepper motor and a piezoelectric motor.

In some aspects, the gas is a sample gas or a reference gas.

In some aspects, the method includes continuously maintaining a second internal pressure of a second bellows at a second constant pressure. The second bellows is configured to contain a second gas and be positioned with a second housing. The method also includes causing, based on the continuously maintaining, delivery of the second gas at the second constant pressure from the second bellows to the mass spectrometer. The second constant pressure is the same as the first constant pressure.

In some aspects, the continuously maintaining the internal pressure at the constant pressure and the continuously maintaining the second internal pressure at the second constant pressure is configured to allow a constant flow of gas from the first bellows and the second bellows to the mass spectrometer. The constant flow of gas is configured to allow for a mole fraction difference of any observable isotope in a mix between the first gas and the second gas to be determined by at least monitoring changes in a beam intensity of the isotope while alternating between first gas and the second gas.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
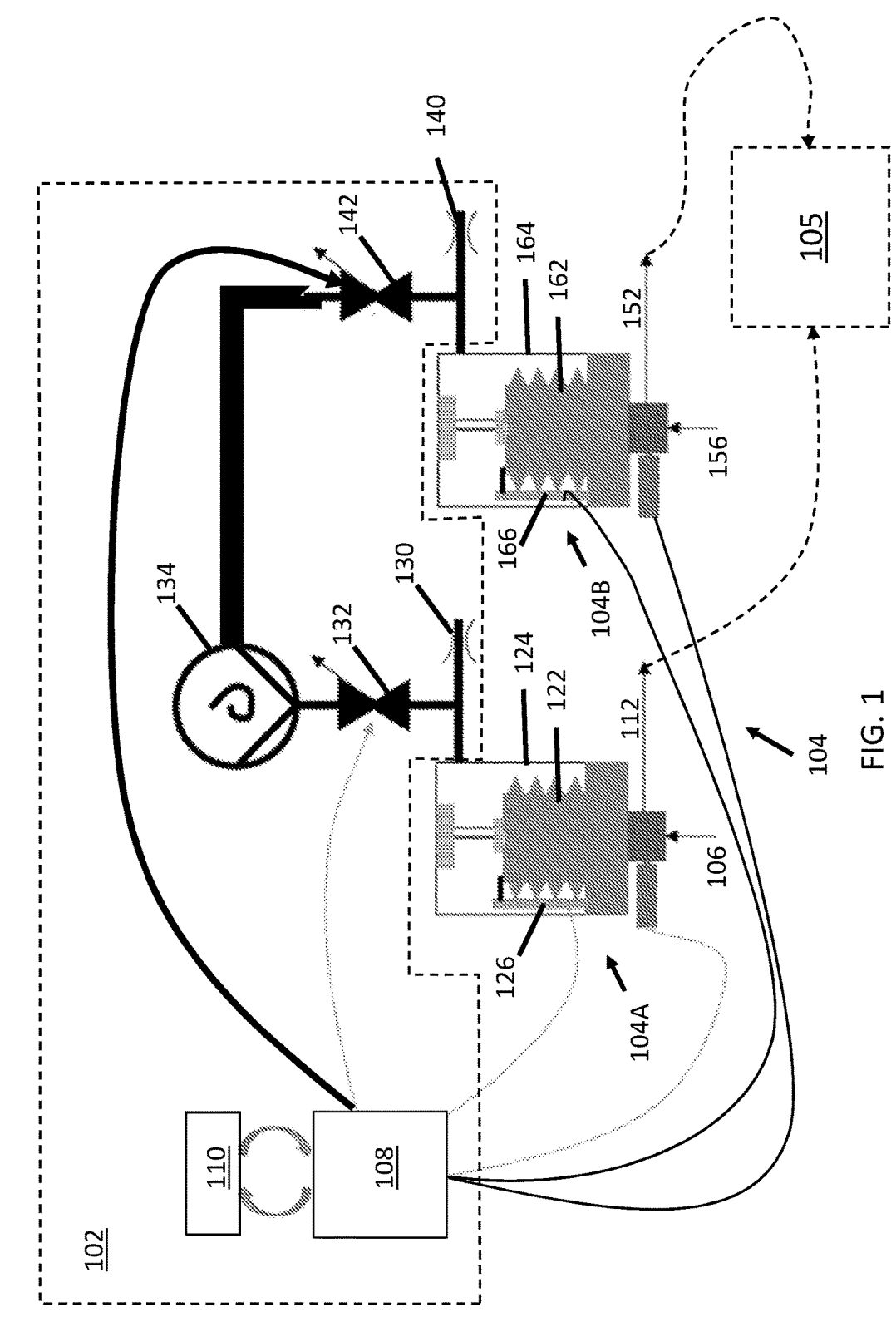
FIG. 1 depicts a block diagram illustrating a mass spectrometer system, in accordance with some example implementations.

Dual-inlet mass spectrometers provide for high precision measurement of gases. In particular, dual-inlet mass spectrometers may be used to determine isotope ratios and isotope mole fractions by introducing a gas sample and reference or standard gas. For example, dual-inlet mass spectrometers use bellows to store sample and standard gases. Sample and standard gases are delivered from compressible volumes that include metal bellows. In use, gas flows from the bellows into the mass spectrometer, which is held at vacuum, through capillaries, which are crimped to have roughly equal gas conductance. The pressure in each of the bellows can be adjusted by compressing the bellows using a conventional motor, such a motor that is not a stepper motor and/or a piezoelectric motor, that only imprecisely positions the bellows. The bellows are compressed such that the ion beam of interest is of comparable intensity on the sample and standard side at the beginning of the measurement. In other words, the pressures in each of the bellows are adjusted to yield equal beam strengths for the sample and standard gases because the ratio of the beam currents of two or more isotopes generally varies with the beam strength, even for a constant isotopic mixture. Thus, it can be important to correct for non-linear impacts on pressure changes of the gases and within the bellows because the non-linear impacts may reduce the stability of the output signal of the mass spectrometer.

However, over the course of a mass spectrometry analysis, the bellows empty gradually while the motor position is fixed. Therefore, the pressure of the gases, internal pressure of the bellows, and the flow rate of the gases decrease over time as the bellows empty. This causes a decrease in the amount of gas provided to the mass spectrometer for analysis over the course of the measurement. The decrease in the amount of sample and standard gases provided to the mass spectrometer may also be unbalanced. Differences in the amount of sample and standard gases introduced into the bellows during the preparation of a measurement further results in both sides of the dual-inlet mass spectrometer depleting at different rates, amplifying the pressure and gas flow rate imbalances that emerge over time. This causes a change in the conditions of the mass spectrometers ionization region which leads to a bias in the measurements and results in inaccurate and unstable measurements. Further, the unbalanced gas flow rates during testing may lead to apparent changes in the isotopic ratio. These changes would generally need to be corrected based on extensive prior calibrations, adding complexity and reducing the integrity of the results. To help account for the drop in pressure over the course of a measurement, motors have been used to adjust the pressure within the bellows. In these conventional system, motors may be used to periodically (e.g., every 30 minutes) adjust a position (e.g., an amount of expansion and/or contraction) of the bellows to adjust the pressure to match the initial pressure. However, as noted above, the pressure of the gases, internal pressure of the bellows, and the flow rate of the gases generally continuously decrease over time as the bellows empty. Thus, periodic adjustment of the bellows position is insufficient when a stable and constant pressure is desired because the pressure of the bellows and as a result the gas flow rates would still change during the measurement, leading to apparent and unbalanced changes in the isotopic ratio over time. Further, mole fraction measurements may generally be done using isotope dilution techniques which involve significant additional labor and complex procedures.

The mass spectrometer system consistent with implementations of the current subject matter constantly monitors and stabilizes the pressure within the bellows, the gas pressure, and gas flow rates by actively controlling the internal pressure of the bellows. This helps to resolve the problem of signal-pressure dependence by actively stabilizing the pressure in the bellows and thus the ionization region of the mass spectrometer during the analysis to offset the impact of gas loss from the bellows. As a result, the mass spectrometer system described herein may eliminate all pressure changes between the sample and standard gases. Thus, the mass spectrometer system may provide for constant pressure and gas flow from the bellows to the mass spectrometer for measuring, which improves the accuracy, consistency, and reliability of the measurements during testing of the gas using the mass spectrometer.

As an example, consistent with implementation of the current subject matter, the mass spectrometer system may constantly monitor and stabilize a pressure in the bellows (and as a result a pressure and/or a flow rate of the gas) by actively adjusting the pressure in an outside chamber or housing surrounding each bellows. Since the bellows are flexible, the internal pressure of the bellows is coupled to the backpressure in the housing. In some implementations, air is leaked into the housing at a low flow rate on one side and the housing is evacuated by a vacuum pump through a proportional control valve (e.g., the valve described herein) on the other side. Varying the opening and closing of the control valve thus allows for precise controlling of the pressure in the housing, and as a result, the bellows. The pressure in the bellows may be used by a controller (e.g., as part of a feedback loop) to modulate the valve. A sliding potentiometer may be attached to the bellows to monitor the position of the bellows, and can be additionally and/or alternatively be used as an input to the controller. This configuration may provide for constant pressure and gas flow from the bellows to the mass spectrometer for measuring, which improves the accuracy, consistency, and reliability of the measurements during testing of the gas using the mass spectrometer.

Additionally and/or alternatively, the mass spectrometer system described herein may include an actuator, such as a motor (e.g., a stepper motor, a piezoelectric motor, a stepper piezoelectric motor, and/or the like) that continuously adjusts the position of the bellows to control and/or stabilize the pressure within the bellows and/or the housing of the bellows. The position of the bellows may additionally and/or alternatively be used as an input to the controller. This configuration may provide for constant pressure and gas flow from the bellows to the mass spectrometer for gas composition analysis, which improves the accuracy, consistency, and reliability of the measurements during measuring of the gas using the mass spectrometer.

As described herein, the mass spectrometer system provides for consistent and stable gas flow rates and pressures from the bellows to the mass spectrometer. Because of at least the precise pressure stabilization provided by the mass spectrometer system consistent with implementations of the current subject matter, differences in gas species ion beam intensities between sample and standard gases reflect differences in the mole fraction of those gases. This allows for building a time series of changes in the mole fraction of many different gases, including noble gases and others, that are tested by the mass spectrometer.

FIG. 1 depicts a block diagram illustrating a mass spectrometer system 100, consistent with implementations of the current subject matter. The mass spectrometer system 100 includes a bellows system 104, a control system 102, and/or a mass spectrometer 105. The control system 102 continuously controls at least a part of the bellows system 104 to maintain an internal pressure of a bellows 222, 252 (described in more detail below) at a constant pressure and/or to cause delivery of gas contained within the bellows at the constant pressure to a mass spectrometer 105.

The mass spectrometer 105 may include a dual-inlet mass spectrometer, among other types of mass spectrometers. As an example using the dual-inlet mass spectrometer, the bellows system 104 may form the inlets (e.g., the dual inlets) to the mass spectrometer 105. A dual-inlet mass spectrometer may be more precise than a conventional spectrometer because repeat comparison of a sample to a standard gas can account for ever-present drift in the instrument. During testing, the mass spectrometer 105 may rapidly alternate supplying continuous streams of a sample gas and a standard gas obtained from the bellows system 104 so that a number of comparison measurements, including isotope ratios, ion mass-to-charge ratios, among others, may be collected for both gases. The mass spectrometer 105 may include an ion counter and/or an array of Faraday cups (e.g., conductive, metal vessels which neutralize ions that hit them while becoming charged), which allows the for the simultaneous detection of multiple isotopes, among other configurations.

As described herein, a sample gas may include a gas, such as a gas of unknown composition, being analyzed by the mass spectrometer 105. The sample gas may include one or more noble gases or other gases (e.g., carbon, nitrogen, etc.). Sample gases may be introduced as pure gases, achieved through combustion, gas chromatographic feeds, chemical trapping, and/or the like. A standard gas may include a gas with known composition that is used as a reference by the mass spectrometer 105 for comparison with the sample gas. By comparing the detected isotopic ratios to a measured standard (e.g., the standard gas), the mass spectrometer 105 may accurately determine the isotopic composition of the sample gas.

The results of the testing by the mass spectrometer 105 may be provided, such as via a display (not shown) coupled to the mass spectrometer system 100. For example, the results, including a mass spectrum, a plot of intensity, and/or other determined data or measurements, may be provided via the display.

Referring to FIG. 1, the bellows system 104 may include at least one bellows subsystem. For example, the bellows system 104 may include a first bellows subsystem 104A and a second bellows subsystem 104B. the first bellows subsystem 104A and the second bellows subsystem 104B may be controlled by the control system 102 to provide a gas (e.g., the sample gas or the standard gas) to the mass spectrometer 105.

The first bellows subsystem 104A may include a first bellows 122 and a first housing 124. The first bellows 122 may contain a gas, such as the sample gas and/or the standard gas. The first bellows 122 may be flexible. The first bellows 122 may be made of metal, or other materials. The bellows may be expanded and/or compressed to cause the gas contained within the first bellows 122 to be delivered to the mass spectrometer 105. The first bellows 122 and/or the gas contained within the first bellows 122 may have an internal pressure that is controlled and/or maintained by the control system 102 to ensure consistent and stable flow rates of the gas at the constant pressure from the first bellows 122 to the mass spectrometer 105.

The first housing 124 may surround the first bellows 122. The first housing 124 may maintain a vacuum around the first bellows 122. This may allow for a pressure, such as an external pressure, within the first housing 124 to be controlled. The external pressure may be an output of the control system 102 that is controlled based on at least the internal pressure and/or a position of the first bellows 122. In some implementations, the first bellows subsystem 104A may include a sliding potentiometer or other positional indication device 126 that indicates the position of the bellows 122 via a change in resistance of the potentiometer or the like. The change in resistance of the first bellows 122 and/or the position of the bellows 122 may be used by the control system 102 to control and/or maintain the internal pressure of the first bellows 122.

Referring again to FIG. 1, the gas (e.g., the sample gas or the standard gas) may be delivered to the first bellows 122 at 106, such as via a port, a controllable opening, and/or the like. The gas contained within the first bellows 122 may be delivered to the mass spectrometer 105 at 112, such as via another port, another controllable opening, and/or the like.

The second bellows subsystem 104B may include a second bellows 162 and a second housing 164. The second bellows 162 may contain a gas, such as the sample gas and/or the standard gas. The second bellows 162 may be flexible. The second bellows 162 may be made of metal, or other materials. The bellows may be expanded and/or compressed to cause the gas contained within the second bellows 162 to be delivered to the mass spectrometer 105. The second bellows 162 and/or the gas contained within the second bellows 162 may have an internal pressure that is controlled and/or maintained by the control system 102 to ensure consistent and stable flow rates of the gas at the constant pressure from the second bellows 162 to the mass spectrometer 105.

The second housing 164 may surround the second bellows 162. The second housing 164 may maintain a vacuum around the second bellows 162. This may allow for a pressure, such as an external pressure, within the second housing 164 to be controlled. The external pressure may be an output of the control system 102 that is controlled based on at least the internal pressure and/or a position of the second bellows 162. In some implementations, the second bellows subsystem 104B may include a sliding potentiometer or other measurement device 166 that indicates a change in resistance based on the position of the sliding potentiometer coupled to the bellows 122 via a change in resistance of the potentiometer or the like. The change in resistance of the second bellows 162 and/or the position of the second bellows 162 may be used by the control system 102 to control and/or maintain the internal pressure of the second bellows 162.

Referring again to FIG. 1, the gas (e.g., the sample gas or the standard gas) may be delivered to the second bellows 162 at 156, such as via a port, a controllable opening, and/or the like. The gas contained within the second bellows 162 may be delivered to the mass spectrometer 105 at 152, such as via another port, another controllable opening, and/or the like.

As described herein, the first bellows subsystem 104A and the second bellows subsystem 104B may be coupled to the mass spectrometer 105 and may each provide a respective one of the sample gas and the reference gas to the mass spectrometer 105 for comparison and testing. The first bellows subsystem 104A and the second bellows subsystem 104B may be the same, except for the gas contained within each respective one of the first bellows subsystem 104A and the second bellows subsystem 104B. Accordingly, while only one of the first bellows subsystem 104A and the second bellows subsystem 104B may be referenced and/or described herein, such as with respect to FIGS. 2A-5, the components of each bellows subsystem may be the same and may include the same and/or similar properties.

Figure 2A:
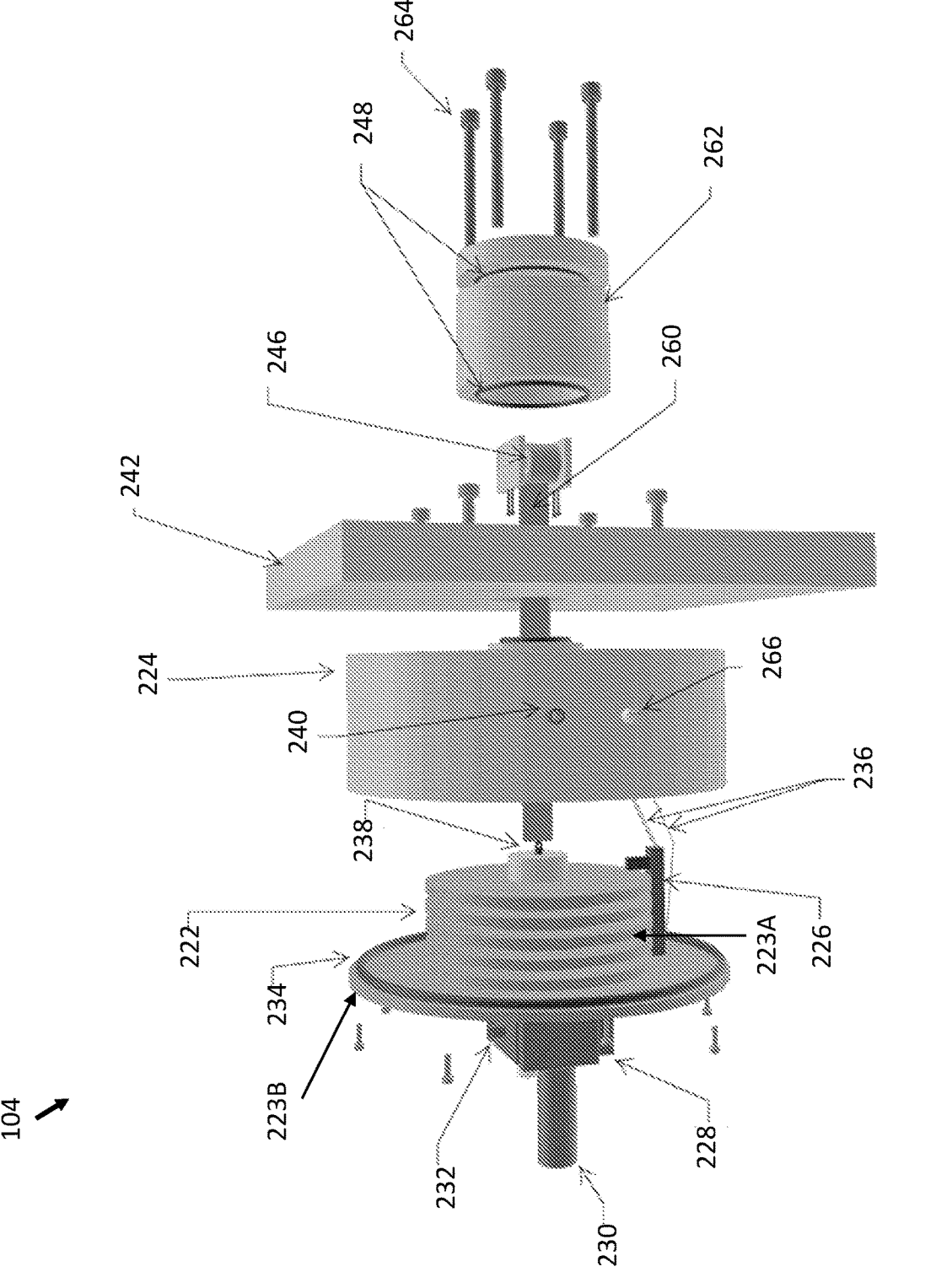
FIG. 2A depicts an example bellows system of a mass spectrometer system, in accordance with some example implementations.
Figure 2B:
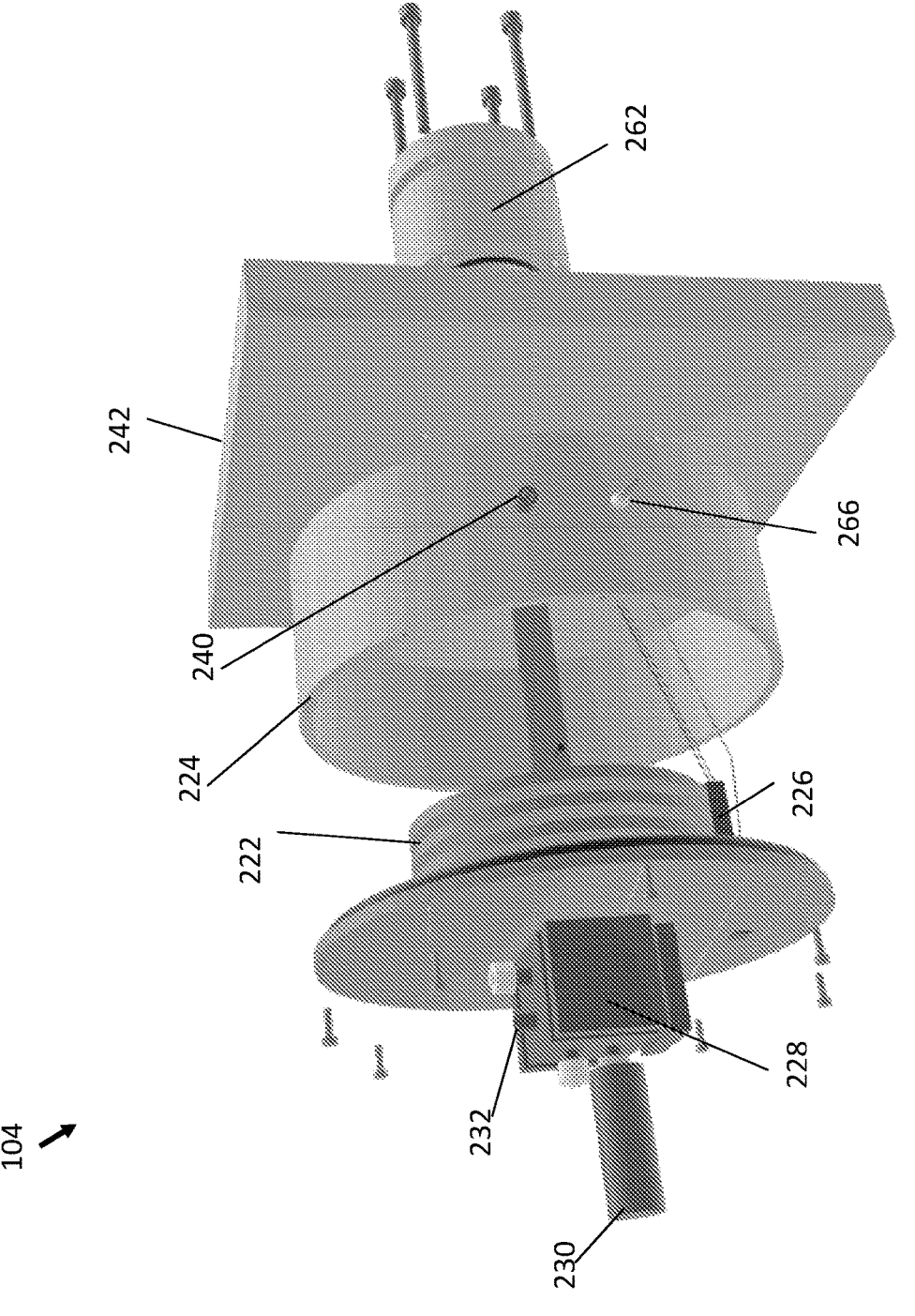
FIG. 2B depicts an example bellows system of a mass spectrometer system, in accordance with some example implementations.
Figure 2C:
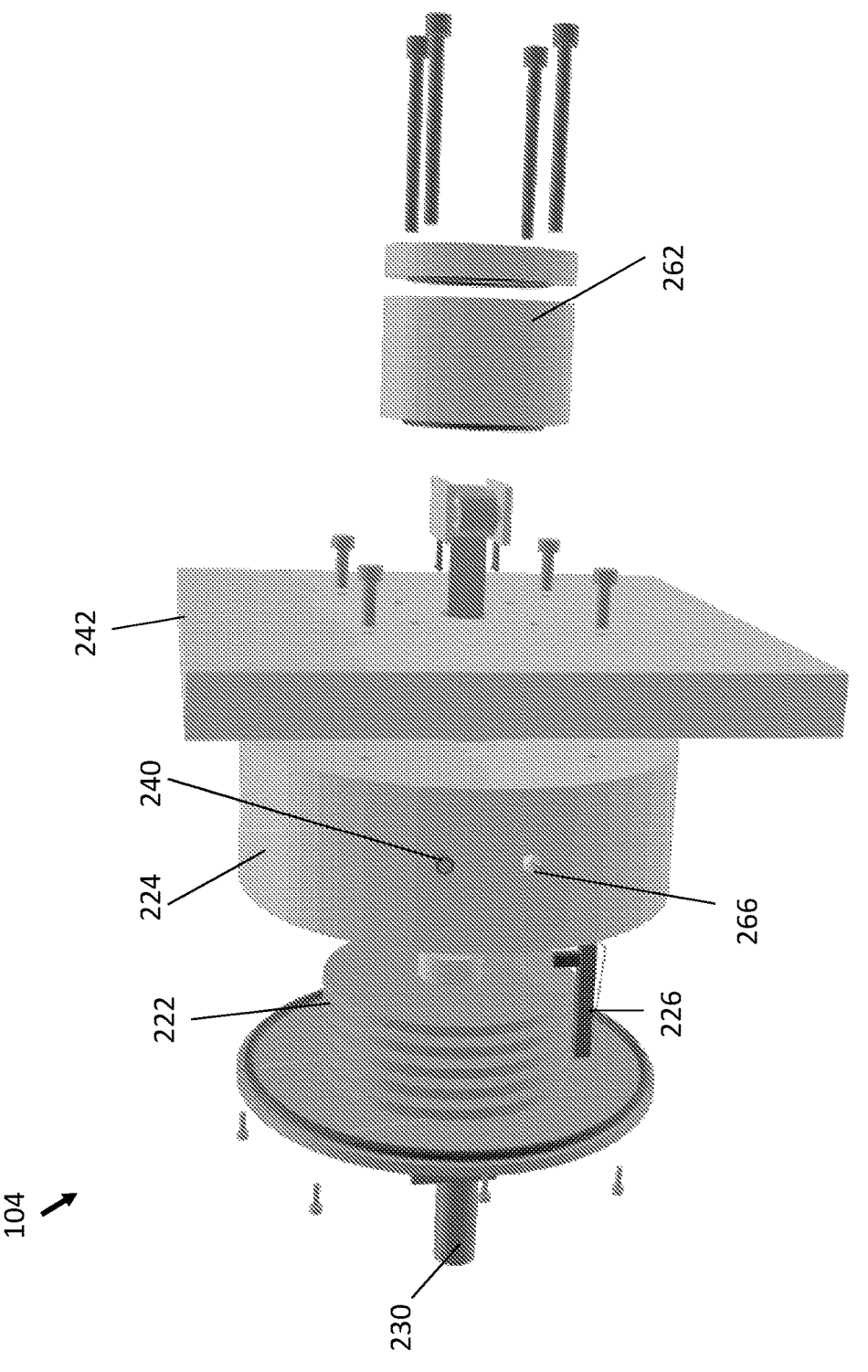
FIG. 2C depicts an example bellows system of a mass spectrometer system, in accordance with some example implementations.

FIG. 2A depicts an exploded side view of the bellows system 104 of the mass spectrometer system 100, consistent with implementations of the current subject matter. FIG. 2B depicts an exploded perspective view of the bellows system 104 of the mass spectrometer system 100, consistent with implementations of the current subject matter. FIG. 2C depicts another exploded perspective view of the bellows system 104 of the mass spectrometer system 100, consistent with implementations of the current subject matter. In FIGS. 2A-2C, the bellows system 104 including a bellows subsystem (e.g., the first bellows subsystem 104A or the second bellows subsystem 104B) is shown. While the bellows subsystem shown in FIGS. 2A-2C are shown and described as including a bellows 222, a housing 224, and/or a sliding potentiometer 226 among other components therein, the bellows 222, the housing 224, and/or the sliding potentiometer 226 may be the same and/or similar to, and/or include the same and/or similar properties as, the first and second bellows 122, 162, the first and second housing 124, 164, and the first and second sliding potentiometer 126, 166 among other components therein, respectively.

Referring to FIGS. 2A-2C, the bellows system 104 includes the bellows 222 and the housing 224. The bellows 222 may contain a gas, such as the sample gas and/or the standard gas. The bellows 222 may be flexible. The bellows 222 may be made of metal, stainless steel, or other materials. The bellows 222 may be expanded and/or compressed to cause the gas contained within the bellows 222 to be delivered to the mass spectrometer 105. The bellows 222 and/or the gas contained within the bellows 222 may have an internal pressure that is controlled and/or maintained by the control system 102 to ensure consistent and stable flow rates of the gas at the constant pressure from the bellows 222 to the mass spectrometer 105.

The housing 224 may surround at least a portion of the bellows 222. For example the bellows 222 may include a flexible portion 223A and a base portion 223B. The flexible portion 223A may be integrally formed with and/or extend from the base portion 223B. The flexible portion 223A may have an outer diameter that is less than an outer diameter of the base portion 223B. The flexible portion 223A may extend into and/or fit within an interior volume of the housing 224. The base portion 223B may include and/or be fitted with a seal 234, such as an O-ring, that seals the base portion 223B to the housing 224. This may help to ensure that the interior volume of the housing 224 is sealed and may help to limit or prevent unintended leakage of air from within the housing 224.

In some implementations, a vacuum may be maintained within the interior volume of the housing 224 around at least the portion of the bellows 222 positioned within the interior volume of the housing 224. This may allow for a pressure, such as an external pressure, within the interior volume of the housing 224 to be controlled. The external pressure may be an output of the control system 102 that is controlled based on at least the internal pressure and/or a position of the bellows 222. The housing 224 may include a fitting 240. The fitting 240 may be coupled to an evacuation device, such as a vacuum pump 134, as described in more detail below. The fitting 240 may be a port that directly or indirectly couples the housing 224 to the vacuum pump 134.

Referring again to FIGS. 2A-2C, bellows system 104 may include a sliding potentiometer or other measurement device 226. Using the sliding potentiometer 226, a change in resistance of the potentiometer can be measured (e.g., continuously and/or periodically) to infer the position of the bellows 222. The change in resistance of the potentiometer 226 and/or the position of the bellows 222 may be used by the control system 102 to control and/or maintain the internal pressure of the bellows 222. The change in resistance of the bellows 222 and/or the position of the bellows 222 may be used to maintain a desired position of the bellows 222 and to ensure the bellows 222 is expanded and/or compressed to a desired level. The sliding potentiometer 226 may include a slider that is coupled to an end of the bellows 222.

The housing 224 may include an electrical feedthrough 266 that provides an electrical connection from outside the housing to the interior volume of the housing, and further to the sliding potentiometer 226. The bellows system 104 may additionally and/or alternatively include electrical connections 236 between the electrical feedthrough 266, such as within the interior volume of the housing 224, and the sliding potentiometer 226, which may also be positioned within the interior volume of the housing 224 when assembled.

Referring to FIGS. 2A-2C, the bellows system 104 includes a valve block 228. The valve block 228 may be coupled to the bellows 222. For example, the valve block 228 may be coupled to the base portion 223B of the bellows 222 on a side of the base portion 223B opposite the flexible portion 223A. The valve block 228 may include at least one valve and/or measuring devices. For example, the valve block 228 may include a port 232. The port 232 may provide access to the interior of bellows 222. In other words, the port 232 may be coupled to the mass spectrometer 105, such as via one or more capillaries. The port 232 may allow for delivery of the gas contained within the bellows 222 to the mass spectrometer 105. The port 232 may be modulated (e.g., opened and/or closed) to allow for the gas to flow from the bellows 222 to the mass spectrometer 105. As described herein, the port 232 of each bellows 222 may be alternatively modulated to allow for the sample gas and the standard gas to be alternatively delivered to the mass spectrometer 105 for testing. For example, the port 232 on the valve block 232 of one bellows system may be opened while the port 232 on the valve block 232 of the other bellows system may be closed (or visa versa). The port 232 may be controlled by the valve block 232. For example, the valve block 232 may include a controller having a processor and a memory that stores instructions that cause the port 232 to open and/or close. Additionally and/or alternatively, the port 232 may be controlled by the control system 102 (e.g., via a controller 110).

The valve block 228 may additionally and/or alternatively include or be coupled to a pressure gauge 230. The pressure gauge 230 may be coupled to the bellows 222, such as via the valve block 228. The pressure gauge 230 may measure the internal pressure of the bellows 222. As described herein, the internal pressure measured by the pressure gauge 230 may be used (e.g., as an input) by the control system 102 to continuously maintain the internal pressure of the bellows 222 at a constant pressure.

Referring again to FIGS. 2A-2C, the bellows system 104 may include a mount 242. The mount 242 may include a mounting plate. The mount 242 may be coupled to the housing 224. The mount 242 may support the housing 224 and/or the bellows 222 for stability. The mount 242 may be positioned on an opposite side of the housing 224 from the bellows 224.

In some implementations, the bellows system 104 includes a spring 260, a spring chamber 252, and a spring mount 238. The spring chamber 262 may surround at least a portion of the spring 260. Within the spring chamber 262, the spring 260 may surround at least one bearing 246. The at least one bearing 246 may support the spring 260 within the spring chamber 262. The spring mount 238 may support the spring 260. The spring mount 238 may couple spring 260 to the bellows 222. For example, the spring mount 238 may couple the spring 260 to an inner side of the flexible portion 223A of the bellows 222 that is positioned within the interior volume of the housing 224. In some implementations, the spring chamber 262 may form a part of the vacuum together with the interior volume of the housing 224. The spring chamber 262 may include one or more seals 248, such as O-rings, to prevent leakage of air from the spring chamber 262. This may help maintain the vacuum within the spring chamber 262 and/or the housing 224. The spring 260, the spring chamber 262, and the spring mount 238 may be coupled to and supported by the mount 242. The spring 260 and/or the spring chamber 262 may be positioned on one side of the mount 242 opposite the bellows 222 and/or the housing 224. The spring chamber 262 may be mounted onto the mount 242 via at least one fastener 264, such as a mechanical fastener or other fastening mechanism.

The spring 260 may include any spring, such as a constant force spring. The spring 260 may exert a force on the bellows 222 to pull the bellows 222 open. The spring 260 may additionally and/or alternatively change the force balance between the internal pressure of the bellows 222 and the external pressure outside of the bellows 222 such that less force is needed to expand the bellows 222, such as via a motor or changing external pressure. The spring 260 may additionally and/or alternatively exert a force on the bellows 222 to maintain at least a minimum position of the bellows 222. For example, the spring 260 may exert a constant force on the bellows 222 to pull the bellows 222 open, even if the gas from the interior of the bellows 222 has been fully evacuated. Since the spring 260 is coupled to the inner side of the flexible portion 223A, the spring 260 may exert a force to pull the bellows 222 open and/or keep the bellows 222 from closing beyond a predetermined minimum distance. This helps to maintain a position of the bellows 222, which may further help to maintain a constant pressure of the gas within the bellows 222. In some implementations, the force exerted by the spring 260 on the bellows 222 may be adjusted (e.g., by the control system 102, such as via the controller 110, or manually) to adjust a resistance and/or position of the bellows 222, which in turn may adjust and/or maintain the internal pressure of the bellows 222. In other implementations, the particular spring 260 may be selected to exert a particular force on the bellows 222. In some implementations, the spring 260 surrounds at least a portion of the bellows 222 and/or the housing 224. The spring 260 may additionally and/or alternatively be concentric with respect to the housing 224 and/or the bellows 222. In other words, a central axis of the spring 260 may be aligned with a central axis of the housing 224 and/or the bellows 222.

Referring back to FIG. 1, the control system 100 includes a data acquisition device 108, which may include or be coupled to a controller 110. The data acquisition device 108 and/or the controller 110 may include at least one data processor and at least one memory for storing instructions configured to be executed by the at least one data processor to stabilize an internal pressure of the bellows 122, 124 and/or to maintain a constant flow rate of the gas from the bellows 122, 124. The controller 110 may be a proportional-integral-derivative ("PID") controller. For example, the controller 110 may be a feedback or control loop mechanism that employs feedback, such as an input to maintain internal pressure of the bellows 122, 124 at a constant pressure. For example, the data acquisition device 108 may receive as an input a measured internal pressure of the first bellows 122 and/or the second bellows 124, such as from the pressure gauge (e.g., pressure gauge 230). Additionally and/or alternatively, the data acquisition device 108 may receive as an input, a change in resistance of the first bellows 122 and/or the second bellows 124, such as based on the respective first and second sliding potentiometers 126, 166.

The control system 100 may additionally and/or alternatively include a first valve 132 or other actuation mechanism, a first air leak 130, a second valve 142 or other actuation mechanism, a second air leak 140, and/or an evacuation device or pump 134. The first valve 132 and the second valve 142 may be coupled to the evacuation device 134 at one end. At another end, the first valve 132 may be coupled to the first air leak 130 and/or to the first housing 124. The second valve 142 may be coupled to the second air leak 130 and/or to the second housing 164. In this way, the evacuation device 134 may be coupled to each of the first valve subsystem 104A and the second valve subsystem 104B via one or more valves, such as the first valve 132 and the second valve 142, respectively.

The evacuation device 134 may include a pump or other evacuation mechanism. The evacuation device may evacuate air from the first housing 124 and/or the second housing 164. The first air leak 130 may be coupled to the first housing 124. The first air leak 130 may constantly leak or otherwise supply air into the first housing 124, which increases the external pressure within the first housing 124 and surrounding the bellows 122, such as the flexible portion of the bellows 122. The second air leak 140 may be coupled to the second housing 164. The second air leak 140 may constantly leak or otherwise supply air into the second housing 164, which increases the external pressure within the second housing 124 and surrounding the bellows 162, such as the flexible portion of the bellows 122.

Each valve (e.g., the valve 132 and/or the valve 142) may include a solenoid valve, another valve, or another actuation mechanism. For example, the valve may be coupled to a line connecting the evacuation device 134 to the respective first housing 124 and/or the second housing 164. Modulation, via the controller 110, of the valve may adjust the amount of air that is evacuated from the interior volume of the first housing 124 and/or the second housing 164, which in turn adjusts the external pressure within the first housing 124 and/or the second housing 164, and as a result, the internal pressure of the first bellows 122 and/or the second bellows 162, respectively. For example, when the valve is opened by the controller 110, air is evacuated from the first housing 124 and/or the second housing 164, reducing the external pressure within the respective housing, and in turn reducing the internal pressure of the corresponding bellows (and gas within the bellows and/or the flow rate of the gas within the bellow). When the valve is closed by the controller 110, air is supplied to the interior volume of the first housing 124 and/or the second housing 164, without being evacuated from the interior volume, increasing the external pressure within the respective housing, and in turn increasing the internal pressure of the corresponding bellows (and gas within the bellows and/or the flow rate of the gas within the bellow).

The controller 110 may modulate (e.g., continuously) each of the first valve 132 and the second valve 142 independently of one another. For example, the controller 110 may independently modulate each of the first valve 132 and the second valve 142 based on the corresponding input (e.g., the internal pressure of the first bellows 122 and/or the second bellows 162 and/or the change in resistance of the first bellows 122 and/or the second bellows 162). The controller 110 may modulate each of the first valve 132 and the second valve 142 to maintain a constant pressure within each of the corresponding first bellows 122 and the second bellows 162. The desired constant pressure may be predetermined. For example, the desired constant pressure may be approximately 0 to 300 mb. For example, the desired constant pressure may be approximately 50 to 100 mb, 1 to 25 mb, 25 to 50 mb, 50 to 75 mb, 75 to 100 mb, 100 to 125 mb, 125 to 150 mb, 150 to 175 mb, 175 to 200 mb, 200 to 225 mb, 225 to 250 mb, 250 to 275 mb, 275 to 300 mb, 300 to 325 mb, 325 mb to 350 mb, 350 mb to 375 mb, 375 to 400 mb, and/or the like. The constant internal pressure may be the same for both the first bellows and the second bellows 162. Accordingly, the controller 110 may continuously maintain the internal pressure of each of the first bellows 122 and the second bellows 162 at a constant pressure. This may help to stabilize the gas flow rate of the gas delivered from each of the first bellows 122 and the second bellows 162 to the mass spectrometer 105. The controller 110 may continuously maintain the internal pressure of the first bellows 122 and/or the second below 162 at the constant pressure with high precision. The high precision of the mass spectrometer system 100 improves the stability of mass spectrometer measurements.

Figure 3A:
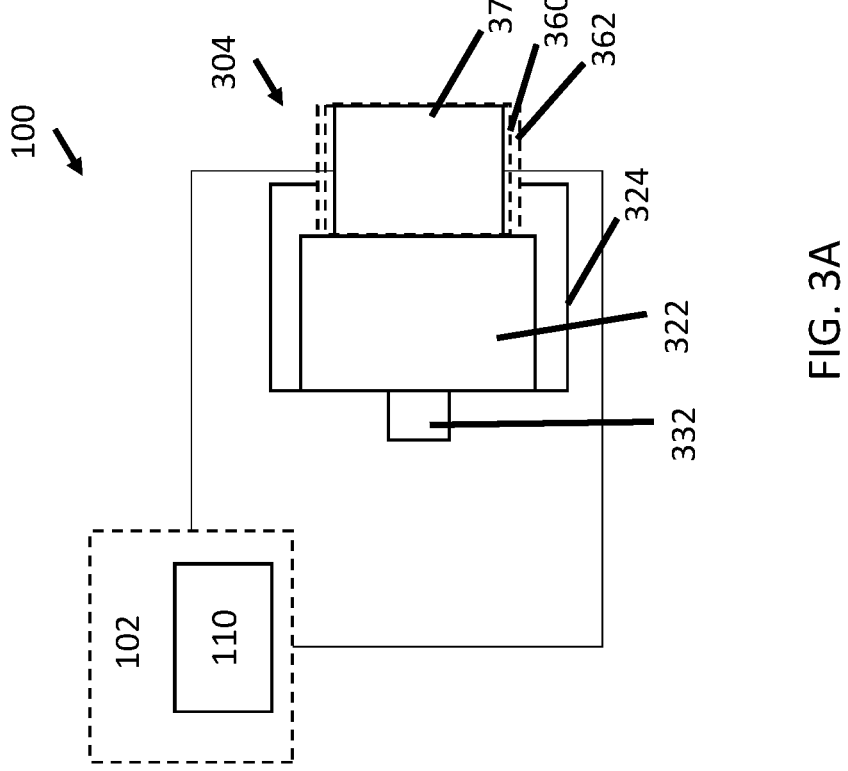
FIG. 3A depicts a block diagram illustrating a mass spectrometer system, in accordance with some example implementations.
Figure 3B:
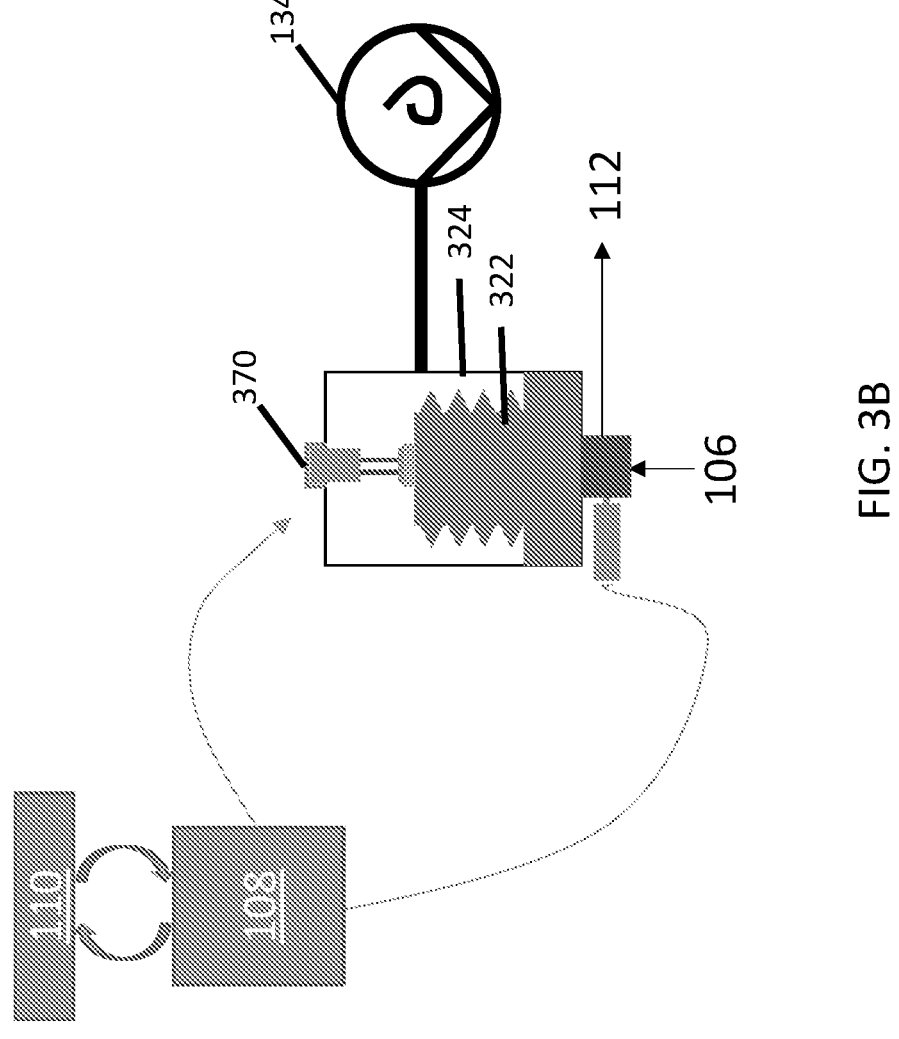
FIG. 3B depicts a block diagram illustrating a mass spectrometer system, in accordance with some example implementations.

FIG. 3A depicts a block diagram illustrating the mass spectrometer system 100, consistent with implementations of the current subject matter. FIG. 3B depicts another block diagram illustrating the mass spectrometer system 100. The mass spectrometer system 100 shown in FIG. 3A may include a bellows system 304, which may be the same and/or similar as the bellows system 104. The bellows system 304 and the bellows system 104 may include one or more components, systems, and/or properties that may be used with and/or interchanged with one another. In some implementations, the bellows system 304 may include a bellows 322, a housing 324, a valve block 332, a spring 360, and a spring chamber 362 that is the same and/or similar to, and/or may interchanged with the bellows 222, the housing 224, the valve block 232, the spring 260, and/or the spring chamber 262, respectively.

Referring to FIG. 3A and FIG. 3B, the bellows system 304 may include an actuator 370. The actuator 370 may be used in addition to and/or alternative to the valve 132 and/or the vacuum pump 134 of the control system 102. The actuator 370 may include a motor, such as at least one of a stepper motor, a piezoelectric motor, and a stepper piezoelectric motor, among other motors. The actuator 370 may be actuated to precisely control a force exerted on the bellows 322. In some implementations, the actuator 370 performs precise stepping, such as at the nanometer level. The actuator 370 may provide an adequate force to counteract a pressure difference of up to 200 mb between inside the housing and inside the bellows to prevent the bellows 322 from becoming fully compressed, such as during evacuation of the gas from within the bellows 322.

For example, the actuator 370 may be coupled to the bellows 322. The actuator 370 may be coupled to an inner side of the bellows 322, such as within the housing 324. The actuator 370 may additionally and/or alternatively be positioned entirely within the housing 324. This allows for the actuator 370 to exert a force on the bellows 322 to pull on (e.g., expand) and/or push on (e.g., compress) the bellows 322. The force exerted on the bellows 322 may be used to maintain and/or control the internal pressure of the bellows 322 to maintain the internal pressure of the bellows 322 at the constant pressure. Accordingly, the actuator 370 may continuously adjust a force exerted on the bellows 322, which helps to maintain the internal pressure of the bellows 322 at a constant pressure. This helps to stabilize the pressure of the gas within the bellows 322, the internal pressure of the bellows 322, and/or the flow rate of the gas from the bellows 322. In some implementations, the interior volume of the housing 324 is held under vacuum. This may help to reduce power requirements of the actuator 370.

Referring to FIG. 3A, the spring 360 may be supported by the actuator 370. The spring 360 may surround the actuator 370, as shown in FIG. 3A, and/or the spring 360 may be coupled to the actuator 370 and/or directly to the bellows 322. The spring 360 may help to maintain at least a minimum position of the bellows 322. In other words, the spring 360 may passively hold open the bellows 322.

As described herein, mole fraction measurements using the mass spectrometer 105 may be performed using isotope dilution techniques involving significant labor and complex procedures. Also as described herein, the mass spectrometer system 100, including the mass spectrometer 100 shown in any and/or all of FIGS. 1-3, the mass spectrometer system 100 continuously controls and/or maintains a stable (or constant) gas flow rate and/or gas pressure from within each of the bellows (the bellows 122, 162, 222, 322) to the mass spectrometer 105. In other words, the mass spectrometer 100, such as via the control system 102 including the controller 110, may continuously maintain the flow of gas from each of the bellows to the mass spectrometer at a constant rate. For at least that reason, the mass spectrometer 105 differences in gas species ion beam intensities between the sample gas and standard gas detected by the mass spectrometer 105 reflect differences in the mole fraction of those gases. This allows for the mass spectrometer system 100 to build a time series of changes in the mole fraction of many different gases, including noble gases and others, that are tested by the mass spectrometer 105.

Additionally and/or alternatively, the configurations of the mass spectrometer system 100 described herein allow for the mass spectrometer 105 to use a single ion beam to make precise mole fraction measurements. Such systems consistent with implementations of the current subject matter can be used for environmental monitoring applications. For example, in the realm of helium, which is commonly found in natural gas, a mass spectrometer deployed to the field could be used to detect small changes in atmospheric helium content, which could be used for the detection of leaks or monitor pollution levels, among other applications.

As another example, the mass spectrometer system 100 configurations described herein allows for the mass spectrometer 105 to use a detector, such as a low cost and/or a low performance detector including a quadrupole, which cannot collect multiple isotopes simultaneously. While generally, drift in source pressure introduces additional noise in these measurements, the mass spectrometer system 100 may eliminate such drift, and as a result the additional noise.

Figure 4:
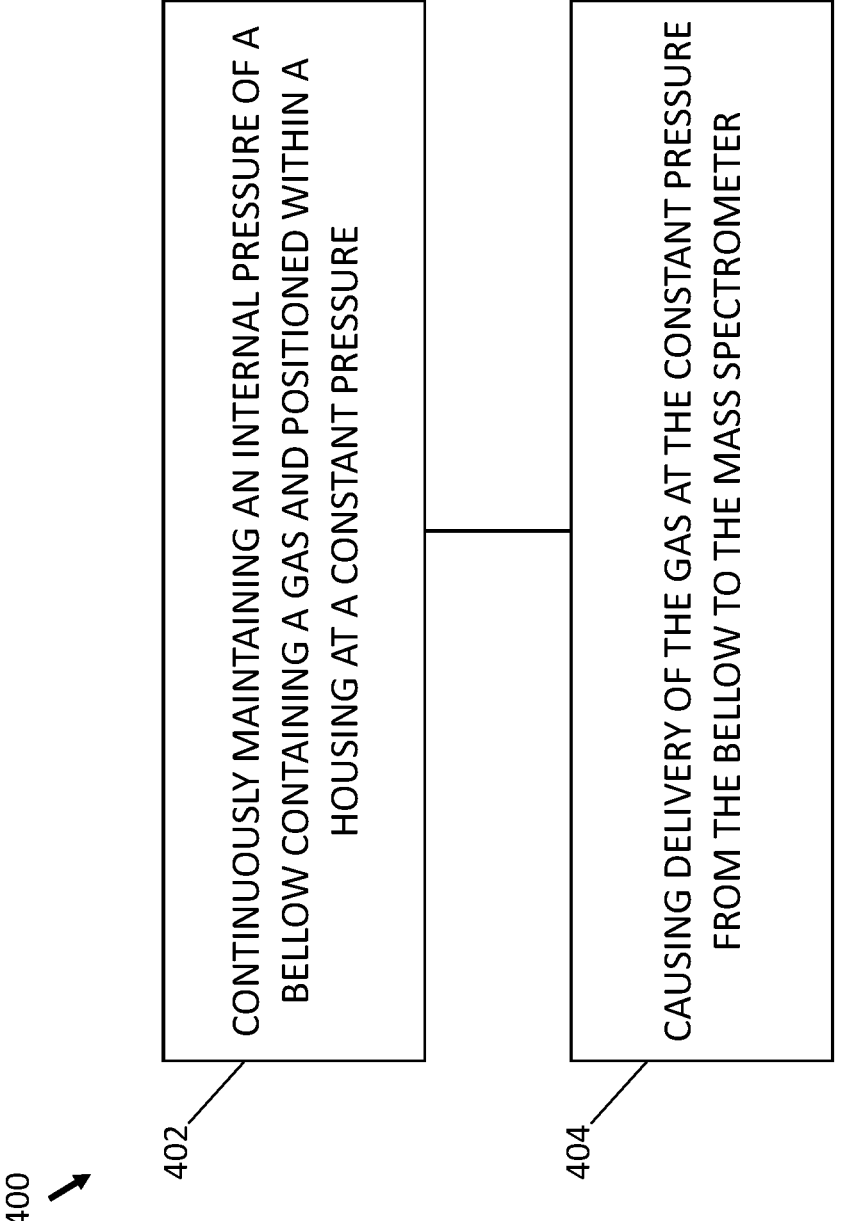
FIG. 4 depicts a flowchart illustrating a process for stabilizing a pressure of a bellows, in accordance with some example implementations.

FIG. 4 depicts a flowchart illustrating a process 400 for stabilizing a pressure of a bellows, consistent with implementations of the current subject matter. The process 400 may be implemented by the control system 102, such as via the controller 110 and/or the data acquisition device 108. The process 400 may be used with the mass spectrometer system 100 shown in FIGS. 1-3, and may be used to control or maintain an internal pressure of the bellows described herein.

At 402, the controller 110 may continuously maintain an internal pressure of a bellows (e.g., the first bellows 122, the second bellows 162, the bellows 222, the bellows 322, etc.) at a constant pressure. The bellows may contain a gas. For example, the bellows may contain a sample gas or a standard gas, as described herein. The bellows may be positioned within a housing (e.g., the first housing 124, the second housing 164, the housing 224, the housing 324, etc.). In some implementations, the interior volume of the housing is held within a vacuum. The housing may have an external pressure within the internal volume and surrounding at least a portion of the bellows within the housing. The constant pressure of the bellows may be predetermined. The controller 110 may additionally and/or alternatively continuously maintain the internal pressure of the bellows at the constant pressure such that a gas flow rate of the gas contained within the bellows is also constant.

Continuously maintaining the internal pressure of the bellows at the constant pressure may include continuously modulating, by the controller 110, a valve (e.g., the first valve 132, the second valve 142, etc.), based on the internal pressure of the bellows. The valve may be a solenoid valve or another actuation mechanism. The valve may be coupled to the housing of the bellows. In some implementations, continuously modulating the valve may adjust the external pressure within the housing and surround at least the portion of the bellows that is positioned within the housing. The adjustment of the external pressure is configured to maintain the internal pressure of the bellows. For example, an increase in the external pressure increases the internal pressure of the bellows. In contrast, a decrease in the external pressure decreases the internal pressure of the bellows.

In some implementations, continuously modulating the valve includes opening the valve based on the internal pressure to evacuate air from the housing. This may cause a decrease in the internal pressure of the bellows. In some implementations, continuously modulating the valve includes closing the valve based on the internal pressure. This may increase the internal pressure of the bellows. For example, an air leak may constantly leak air into the interior volume of the housing. This increases the external pressure within the housing such as when the valve is closed. As such, the internal pressure of the bellows would be increased.

Additionally and/or alternatively, continuously modulating the valve includes opening the valve based on the internal pressure to allow for a larger stream of air to leak into the housing, through the valve. This may cause an increase in the internal pressure of the bellows. In some implementations, continuously modulating the valve includes closing the valve based on the internal pressure. This may decrease the internal pressure of the bellow because the air is prevented from leaking into the housing, while air may be constantly evacuated from the housing, such as via the evacuation pump. This decreases the external pressure within the housing such as when the valve is closed.

Additionally and/or alternatively, the controller 110 continuously modulates the valve based on a change in resistance of the sliding potentiometer to maintain and/or adjust the bellows position. The controller 110 may use the internal pressure and/or the change in resistance as an input to modulate the valve, and as a result maintain the position.

Additionally and/or alternatively, the controller 110 may continuously maintain the internal pressure at the constant pressure by continuously adjusting a force exerted on the bellows by an actuator coupled to the bellows. For example, the controller 110 may control a motor, such as a stepper motor and/or a piezoelectric motor, coupled to the bellows.

As described herein, the mass spectrometer may be a dual-inlet mass spectrometer. Accordingly, in some implementations, the mass spectrometer system includes multiple bellows subsystems, each including a respective bellows, housing, and valve (e.g., a first and second bellows, a first and second housing, and a first and second valve). The bellows of each bellows subsystem may contain different gases. For example, one bellows may contain a sample gas and the other bellows may contain a standard gas. Each respective valve corresponding to the different bellows and housing may be independently controlled by the controller 110. Such configurations may help to maintain the internal pressure of each bellows at the constant pressure. The constant pressure, which may be predetermined, may be the same or different for each bellows. Thus, the controller 110 may continuously maintain the internal pressure of each bellows at the respective constant pressure.

At 404, the controller 110 may cause, based on the continuously maintaining, delivery of the gas from the bellows to the mass spectrometer at the constant pressure. For example, the controller 110 may alternatively deliver the gas from multiple bellows to the mass spectrometer for comparing a sample gas contained within one bellows to a standard gas contained within another bellows. Thus, the controller 110 may cause, based on the continuously maintaining, delivery of a second gas at a second constant pressure from the second bellows to the mass spectrometer.

In some implementations, continuously maintaining the internal pressure of the first bellows and/or the second bellows yields constant pressure conditions in the mass spectrometer, such as within the ionization chamber of the mass spectrometer. This improves performance and stability of the mass spectrometer. In some implementations, continuously maintaining the internal pressure of a first bellows at a first constant pressure and continuously maintaining a second internal pressure at a second constant pressure allows for determination of a mole fraction between the gases (e.g., the first gas and the second gas) contained within each of the bellows.

Figure 5:
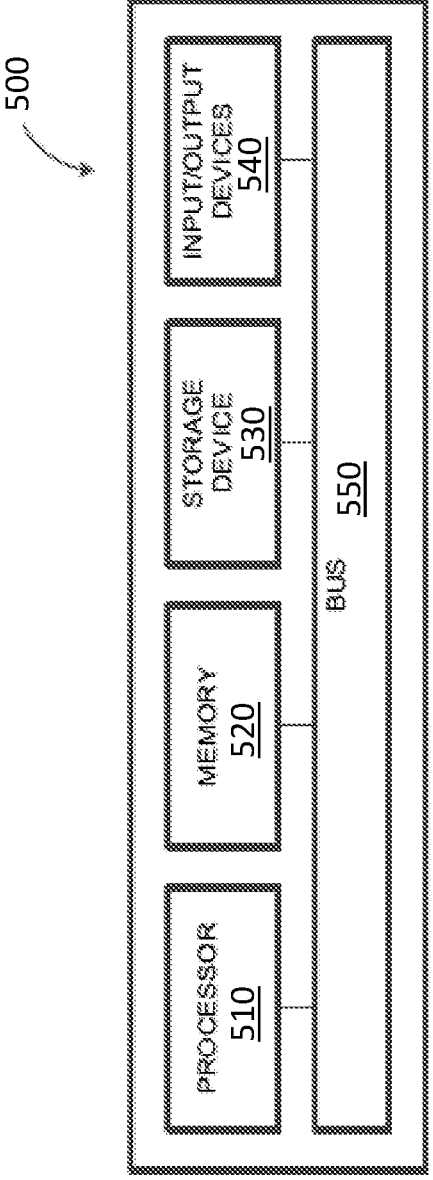
FIG. 5 depicts a block diagram illustrating a computing system, in accordance with some example implementations.

FIG. 5 depicts a block diagram illustrating a computing system 500 consistent with implementations of the current subject matter. Referring to FIGS. 1-4, the computing system 500 can be used to implement the mass spectrometer system 100, such as the bellows system 104, the control system 102, and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the control system 102 and/or the bellows system 104. In some example implementations, the processor 510 can be a single-threaded processor. Alternatively, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or any other suitable persistent storage means. The input/output device 540 provides input/output operations for the computing system 500. In some example implementations, the input/output device 540 includes a keyboard and/or pointing device. In various implementations, the input/output device 540 includes a display unit for displaying graphical user interfaces.

According to some example implementations, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example implementations, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

As used herein, the term "message" encompasses a wide variety of formats for communicating (e.g., transmitting or receiving) information. A message may include a machine readable aggregation of information such as an XML document, fixed field message, comma separated message, JSON, a custom protocol, or the like. A message may, in some embodiments, include a signal utilized to transmit one or more representations of the information. While recited in the singular, it will be understood that a message may be composed, transmitted, stored, received, etc. in multiple parts.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A mass spectrometer system for a mass spectrometer comprising:
   a bellows system comprising:
      a bellows configured to contain a gas, wherein the bellows has an internal pressure within the bellows; and
      a housing configured to surround the bellows; and
   a control system coupled to the bellows system, the control system comprising a controller configured to: continuously maintain the internal pressure of the bellows at a constant pressure; and cause, based on the continuously maintaining, delivery of the gas at the constant pressure from the bellows to the mass spectrometer.

2. The mass spectrometer system of claim 1, wherein the control system comprises:
   a valve coupled to the housing of the bellows system; and
   wherein the controller is configured to continuously modulate the valve based on the internal pressure of the bellows to maintain the internal pressure of the bellows.

3. The mass spectrometer system of claim 2, wherein the continuous modulation of the valve by the controller is configured to adjust an external pressure within the housing and surrounding the bellows; and wherein the adjustment of the external pressure is configured to maintain the internal pressure of the bellows.

4. The mass spectrometer system of claim 2, wherein the control system further comprises: a vacuum pump coupled to the valve; wherein the continuous modulation of the valve by the controller includes causing the valve to open; wherein the vacuum pump evacuates air from the housing when the valve is open; and wherein the evacuation of the air from the housing causes a decrease in the internal pressure of the bellows.

5. The mass spectrometer system of claim 2, wherein the control system further comprises an air leak configured to constantly leak air into the housing, wherein the continuous modulation of the valve includes causing the valve to close; and wherein the air leak causes an increase in the internal pressure of the bellows when the valve is closed.

6. The mass spectrometer system of claim 2, wherein the valve includes a solenoid valve.

7. The mass spectrometer system of claim 2, wherein the bellows system further comprises a sliding potentiometer; wherein the controller is configured to continuously modulate the valve based on the internal pressure of the bellows and/or a measured change in resistance of the sliding potentiometer to maintain the internal pressure and/or adjust the position of the bellows.

8. The mass spectrometer system of claim 1, wherein the control system further comprises: a data acquisition device coupled to the controller; wherein the bellows system further comprises a pressure gauge coupled to the bellows and configured to measure the internal pressure of the bellows; and wherein the data acquisition device is configured to receive the measured internal pressure from the pressure gauge for use by the controller to continuously maintain the internal pressure of the bellows.

9. The mass spectrometer system of claim 1, wherein the housing is configured to maintain a vacuum around the bellows.

10. The mass spectrometer system of claim 1, wherein the bellows system further comprises a spring coupled to the bellows system; and wherein the spring is configured to exert a force on the bellows.

11. The mass spectrometer system of claim 10, wherein the spring is a constant force spring.

12. The mass spectrometer system of claim 10, wherein the bellows system further comprises a mounting plate on which the bellows and the housing are mounted; and wherein the spring is positioned on an opposite side of the mounting plate relative to the bellows and the housing.

13. The mass spectrometer system of claim 1, wherein the control system comprises an actuator coupled to the bellows, wherein the actuator is configured to continuously adjust a force exerted on the bellows, and wherein the continuous adjustment of the force exerted on the bellows is configured to maintain the constant pressure within the bellows.

14. The mass spectrometer system of claim 13, wherein the actuator is a motor.

15. The mass spectrometer system of claim 14, wherein the motor is at least one of a stepper motor and a piezo-electric motor.

16. The mass spectrometer system of claim 1, wherein the gas is a sample gas or a reference gas.

17. The mass spectrometer system of claim 1, further comprising:
   a second bellows system comprising:
      a second bellows configured to contain a second gas different from the gas, wherein the second bellows has a second internal pressure within the second bellows; and
      a second housing configured to surround the second bellows;
      wherein the controller is configured to: continuously maintain the second internal pressure of the second bellows at a second constant pressure; and cause the second gas from the second bellows to be delivered to the mass spectrometer at the second constant pressure; and wherein the second constant pressure is the same as the first constant pressure.

18. The mass spectrometer system of claim 17, wherein the continuous maintaining of the internal pressure at the constant pressure and the second internal pressure at the second constant pressure is configured to allow a constant flow of gas from the first bellows and the second bellows to the mass spectrometer, wherein the constant flow of gas is configured to allow for a mole fraction difference of any observable isotope in a mix between the gas and the second gas to be determined by at least monitoring changes in a beam intensity of the isotope while alternating between gas and the second gas.

19. A control system for use with a mass spectrometer, the control system comprising: at least one data processor; and at least one memory storing instructions which, when executed by the at least one data processor, result in operations comprising:

continuously maintaining an internal pressure of a bellows at a constant pressure, wherein the bellows is configured to contain a gas and be positioned within a housing; and causing, based on the continuously maintaining, delivery of the gas at the constant pressure and a constant gas flow rate from the bellows to the mass spectrometer.

20. The control system of claim 19, wherein the continuously maintaining comprises continuously modulating, based on the internal pressure, a valve coupled to the housing of the bellows.

\* \* \* \* \*